United States Patent [19]

Busch et al.

[11] 3,902,847
[45] Sept. 2, 1975

[54] DIAGNOSTIC DEVICE AND METHOD FOR THE DIAGNOSIS OF MUCOVISCIDOSIS (CYSTIC FIBROSIS)

[75] Inventors: Ernst-Werner Busch; Hans Lange, both of Lampertheim; Hans-Georg Rey; Walter Rittersdorf, both of Mannheim-Waldhof, all of Germany

[73] Assignee: Boehringer Mannheim G.m.b.H., Mannheim, Germany

[22] Filed: Apr. 9, 1973

[21] Appl. No.: 349,583

[52] U.S. Cl. .......................... 23/230 B; 23/253 TP
[51] Int. Cl.² ...................... G01N 33/16; G01N 21/06; G01N 31/08
[58] Field of Search ...... 23/230 B, 253 TP; 252/408

[56] References Cited
UNITED STATES PATENTS

| | | | |
|---|---|---|---|
| 3,232,710 | 2/1966 | Rieckmann et al. | 23/253 TP |
| 3,418,079 | 12/1968 | Rey et al. | 23/253 TP |
| 3,420,205 | 1/1969 | Morison | 23/253 TP X |
| 3,443,903 | 5/1969 | Haack et al. | 23/230 B |

OTHER PUBLICATIONS
Cain et al., Archives of Disease in Childhood, V. 47, pp. 131–132 (1972).

*Primary Examiner*—Morris O. Wolk
*Assistant Examiner*—Timothy W. Hagan
*Attorney, Agent, or Firm*—Burgess, Dinklage & Sprung

[57] ABSTRACT

Mucoviscidosis (cystic fibrosis) is detected in its early stages, particularly in the large-scale screening in newborn infants, by means of measuring the pathologically elevated protein content in the meconium, using a diagnostic agent comprising a protein test strip sealed to a longer plastic strip, applying meconium to the (flush) bottom portion of the combined strip, immersing the smeared portion of the strip in water, permitting water to wet the strip by ascending chromatography, and reading a color change in the strip as an indication of elevated protein content in the meconium.

9 Claims, No Drawings

DIAGNOSTIC DEVICE AND METHOD FOR THE DIAGNOSIS OF MUCOVISCIDOSIS (CYSTIC FIBROSIS)

The subject of the present invention is a diagnostic agent and a method for the early recognition of mucoviscidosis (cystic fibrosis) by way of detection of the albumin content of the meconium Mucoviscidosis, also called cystic fibrosis, is a genetically caused metabolic disease which occurs in approximately 0.05% of all newborn infants. It manifests itself in a thickening of the secreta of all mucous organs, especially the bronchia, the nasal sinuses, the bile and the pancreas.

If mucoviscidosis remains untreated it is nearly always fatal. 90% of all afflicted and untreated infants do not survive the first year of life. The chances of a cure are improved by early detection and commencement of therapy. The early and comprehensive testing of all newborn infants is therefore urgently needed.

A number of methods for the discovery of mucoviscidosis are based on the detection of the increased sodium chloride content in secreta such as sweat or saliva and in the nails and hair. The higher sodium chloride level can be determined by means of conductivity measurements, with ion-sensitive electrodes, by chemical methods, or by neutron activation. All of these methods are either too complex, too expensive, or cannot be applied until it is too late, so that they are utterly useless for the large-scale screening of all newborn infants. A quick test for increased chloride content in sweat has also failed to gain acceptance.

Timely diagnosis permits the determination of the pathologically elevated albumin content in the first bowel movement or meconium of the infant. The prior-art methods for the detection of albumin such as precipitation with sulfosalicylic acid or trichloroacetic acid and immunodiffusion are also too expensive for a broad screening.

The use of a commercially available protein test paper for detecting an elevated albumin content in the meconium is also known, in which the procedure is as follows:

A small amount of meconium is stirred with a few drops of water on a microscope slide. One edge of the test strip is held in this suspension. The water is absorbed into the test strip and there causes a green coloration of greater or lesser intensity according to the albumin content. Although this method may appear simple, it has important disadvantages which are an obstacle to its widespread use as a screening method. The preparation of the suspension of the meconium and especially the careful absorption of the moisture with the edge of the test strip require a degree of care that cannot be expected in the routine operation of a maternity ward, much less in a delivery in the home. On the other hand, the albumin is diluted without control, and the reading of the 5 × 5 mm. test area is not easy, especially when it is partly soiled with the often greenish looking meconium. In a series of tests of approximately 30,000 meconia, 14 positive cases were found. This corresponds to approximately 1 positive finding in 2,000 meconia (reported by P. T. Bray of Penarth, South Wales, England, at the 3 rd European Workshop on Cystic Fibrosis held at Erbach, Western Germany, in 1972).

It has now surprisingly been found that a reliable, rapid and generally applicable method of detecting albumin in the meconium is possible if one proceeds in accordance with the invention.

Essentially, the invention provides a diagnostic agent, and method using such agent, comprising a protein test strip sealed to a plastic carrier strip which is longer than the test strip and thus protrudes therefrom at one end.

Typically, rectangular protein test paper (approx. 6 × 30 mm.) is sealed to a strip of plastic that is just as wide but slightly longer and protrudes beyond the test paper at one end of the combined strip. If a smear of meconium about 5 mm. wide is applied to the bottom margin of the test paper (on the non-protruding end) and the test strip is placed in water, the area into which the water has chromatographed will be partially blue-colored if albumin is present.

The method of the invention is explained as follows:

Virtually any of the known and sometimes commercially available protein test papers are suitable if they permit a sensitive detection of albumin. Such test papers contain a buffer, a wetting agent in some cases, and a so-called protein fault indicator. In particular they contain the two highly sensitive agents, tetrabromphenol blue and tetrabromphenolphthalein ethyl ester. The latter is especially preferred, because, particularly when it is used together with nitrogenous anionic wetting agents, it produces bright blue colors with albumin. A test paper of this kind is described in West German Pat. No. 1,255,353.

The width of the test paper and hence of the test strip may amount to between 4 and 10 mm., preferably 5 to 6 mm. In smaller widths, ease of reading and mechanical stability are no longer assured. Greater widths offer no advantages and they are uneconomical; furthermore, they would require excessively large chromatography vessels. The length of the test papers may amount to from 20 to 40 mm., preferably 30 mm. Shorter lengths do not assure a sufficiently great chromatography area, and greater lengths are likewise uneconomical.

The test paper is sealed to a plastic strip that is of the same width and 20 to 80 mm., preferably 30 to 50 mm. longer. This assures the mechanical stability of the test paper both in the absorption of the meconium and in the chromatography that follows. The projecting part of the plastic serves as a handle so that the test paper does not have to be touched with the fingers.

Basically any plastic is usable if its nature and the thickness of the strip assure the above-mentioned mechanical stability. Polyesters in a thickness of about 0.19 mm. have proven especially practical. The sealing is to assure the secure adhesion of the test papers to the support in the dry state and especially in the wet state. Any adhesives are usable which fulfill the above requirement and do not enter any reaction with the components of the test papers. Transfer adhesives and hot sealing adhesives such as polyethylene, for example, may be used. Fusible adhesives on a wax basis, which melt at very low temperatures and thus permit the test papers to be adhered in a gentle manner have proven especially valuable.

The technical manufacture of a preferred embodiment is performed in the following manner:

A roll of filter paper is continuously impregnated with the desired protein test formula, dried, and cut into ribbons 30 mm. wide. This ribbon of test paper is passed between two rolls together with a plastic ribbon 60 to 80 mm. wide which is coated with fusible adhesive, the roll which contacts the plastic being heated. The test paper and the plastic must be even with one another at one edge. It is also possible, however, to seal a test paper ribbon to the center of a plastic band that has twice the above width and the whole can then be divided down the center. It is desirable during the sealing to use a thin protective material as well so as to prevent the counter-roll and the test paper from being contaminated with excessive fusible adhesive.

The sealed ribbons are then cut into strips 6 mm. wide and the test strips thus completed are packed in containers which should be provided with a drying agent.

To test the meconium these test strips are used as follows:

The bottom portion of the test portion (i.e., the non-protruding end of the plastic strip) is covered with meconium on a width of about 5 mm. This is best done by pressing the test strip against the meconium and more or less scooping up a suitable portion of it. Then the test strip is placed in a small vessel whose bottom is covered with water, doing so in such a manner that the surface of the water does not come above the area smeared with meconium. Small plastic tubes with a flat bottom have proven good for this purpose (e.g., about 10 mm. diameter, 30 mm. height) because they can be discarded, so that cleaning is unnecessary.

When the test strip has been placed in the water, the water penetrates through the meconium, dissolves the albumin and transports it into the test paper where it reacts with the protein fault indicator to produce a blue dye.

This dye is chromatographed by the migration of the water in the test paper from the point where the meconium was applied, and thus it becomes visible. The time of the chromatography is not critical. The process can be interrupted when about three-fourths of the test paper has been wetted with water, which is the case after about 3 to 5 minutes. The process may also be permitted to run to completion, leaving the strip even for hours in the test tube, without falsifying the results. After removal the test strip may be dried and filed as a document.

Normal meconium leaves the yellow color of the test papers unaltered, or at most turns it greenish. A blue color points unequivocally to an elevated albumin content. The diagnosis must be confirmed by other methods, because an elevated albumin content in the meconium can be brought about in some rare cases by other diseases (Melaena neonatorum, intestinal atresia).

The process of the invention is extremely simple, reliable, and usable even by untrained personnel. A clinical test on approximately 6,000 newborn infants in 9 clinics proved that it is suitable as a screening method for the testing of all newborn babies. That twice as many cases of mucoviscidosis were found by this test as had been expected underscores the great importance of the early diagnosis of this disease and hence also the importance of the method of the invention. Out of 9 positive findings, the diagnosis of cystic fibrosis was confirmed in 6 cases by pilocarpine iontophoresis. In 2 cases an intestinal atresia was involved and in one case melaena was found. This corresponds to approximately one positive result in 1,000 meconia, that is, twice as many diagnoses of cystic fibrosis in comparison to the technique using the protein test strips of the prior art.

The diagnostic agent of the invention and the method of the invention will be further illustrated in the following examples:

EXAMPLE 1

Filter paper is impregnated with the following solutions and dried

| Solution 1 | |
|---|---|
| Citric acid, monohydrate | 4.66 g. |
| Trisodium citrate, dihydrate | 13.06 g. |
| Sodium lauroylsarcosinate | 0.04 g. |
| Methanol | 40 ml. |
| Distilled water | 60 ml. |
| Solution 2 | |
| Tetrabromphenolphthalein ethyl ester | 0.05 g. |
| Magnesium sulfate, heptahydrate | 5.94 g. |
| Methanol | to make 100 ml. |

The result is a yellow test paper which is cut into ribbons 30 mm. wide. These ribbons are sealed together with wax coated polyester ribbons 77 mm. wide such that the test paper and the plastic terminate flush. The sealed ribbons are cut into strips 6 mm. wide.

A test strip is covered at the bottom end with meconium on a width of about 5 mm. and placed in a flat-bottomed polystyrene vessel of about 14 mm. diameter and 32 mm. height into which 3 to 5 drops of water have previously been placed. The water rises upwardly in the test paper. If a pathological amount of albumin is contained in the meconium, irregularly shaped areas of strong blue coloration are found on the test paper.

EXAMPLE 2

Filter paper is impregnated with a solution of 5.5 g. of trisodium citrate dihydrate and 9.0 g. of citric acid monohydrate in 100 ml. of water and dried. Then it is reimpregnated and dried with methanolic solutions of one of the following compositions:

| Test Paper | Indicator | mg. per 100 ml. | Wetting agent | mg. per 100 ml. |
|---|---|---|---|---|
| a | Tetrabromphenol blue | 200 | — | |
| b | Tetrabromphenol blue | 200 | Sodium lauroyl sarcosinate | 40 |
| c | Tetrabromphenolphthalcinethyl ester | 50 | — | |
| d | Tetrabromphenolphthalein ethyl ester | 50 | Sodium dodecylbenzene sulfonate | 50 |
| e | Tetrabromphenolphthalein ethyl ester | 50 | Sodium lauroyl sarcosinate | 40 |

The test papers were sealed to plastic as described in Example 1. A polyethylene-coated polyester may also be chosen as the plastic.

In the presence of meconium containing albumin, the colors in the case of test papers a and b are blue-green, in the case of c and d greenish blue, and in the case of e pure blue.

It will be understood that the specification and examples are illustrative but not limitative of the present invention and that other embodiments within the spirit and scope of the invention will suggest themselves to those skilled in the art.

What is claimed is:

1. Diagnostic device for detecting pathologically elevated protein content in meconium comprising a protein test strip sealed over the entire surface area of one of its faces to a plastic strip which is longer than the test strip and protrudes therefrom, said test strip having a length which provides a sufficiently great chromatography area.

2. Diagnostic device as claimed in claim 1 wherein said test strip is 4 to 10 mm. wide and 20 to 40, mm. long and the plastic strip is of the same width but 20 to 80 mm. longer.

3. Diagnostic device as claimed in claim 2 wherein the test strip is 5 to 6 mm. wide and 30 mm. long, and the plastic strip is 60 to 80 mm. long.

4. Diagnostic device as claimed in claim 1, wherein protein test strips are used which indicate the elevated protein content by intense blue coloration.

5. Diagnostic device as claimed in claim 1 wherein the plastic strip is a polyester stip about 0.19 mm. thick.

6. Method for the detection of pathologically elevated protein content in the meconium, comprising applying some meconium to the bottom portion of a protein test strip as claimed in claim 1, the strip is then placed in a vessel containing water, and the elevated protein content is read on the portion of the test strip that has been moistened by ascending chromatography.

7. Method as claimed in claim 6 wherein the stip is placed in the water in such a manner that the water level is not above the test strip area smeared with meconium.

8. Method as claimed in claim 7 wherein at least three-quarters of said test paper is permitted to be wetted with the water.

9. Diagnostic device for detecting pathologically elevated protein content in meconium comprising a protein test strip sealed to a plastic strip which is longer than the test strip such that said plastic strip protrudes beyond the test strip at one end of the combined strip and is flush with the test strip at the other end, said test strip having the length which provides a sufficiently great chromatography area.

* * * * *